Nov. 13, 1928.
A. L. MORSE
1,691,205
POWDER DISTRIBUTING APPARATUS
Filed April 24, 1925   2 Sheets-Sheet 1
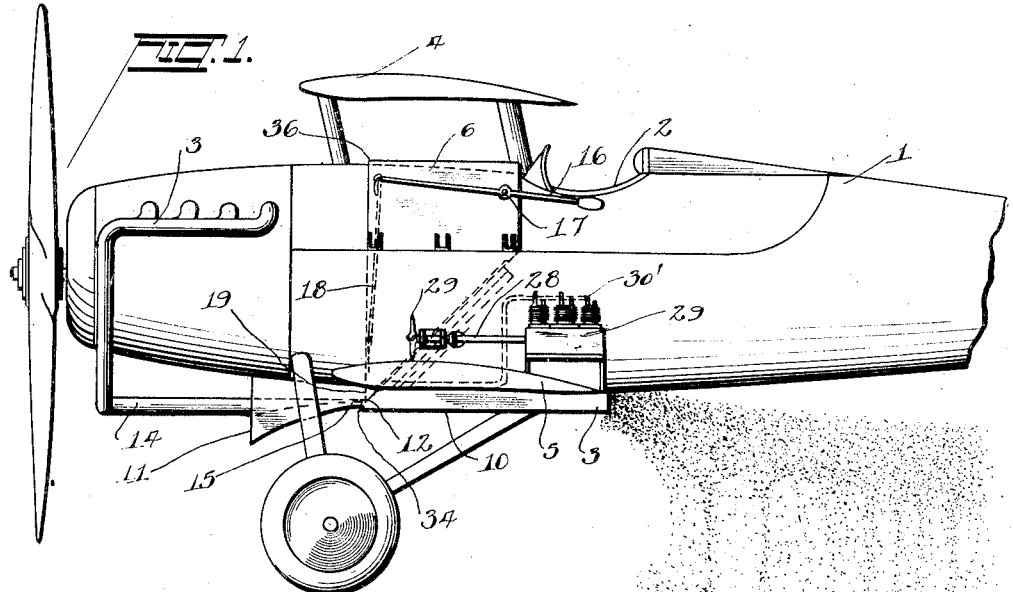
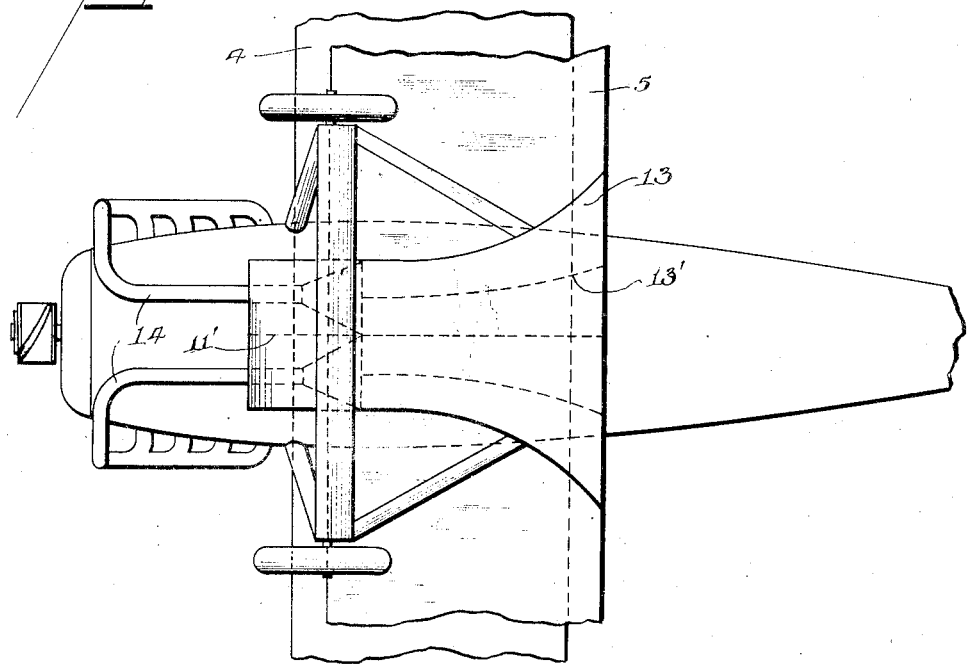
INVENTOR
Alan L. Morse
BY
ATTORNEY Nov. 13, 1928.  
A. L. MORSE  
1,691,205  
POWDER DISTRIBUTING APPARATUS  
Filed April 24, 1925   2 Sheets-Sheet 2
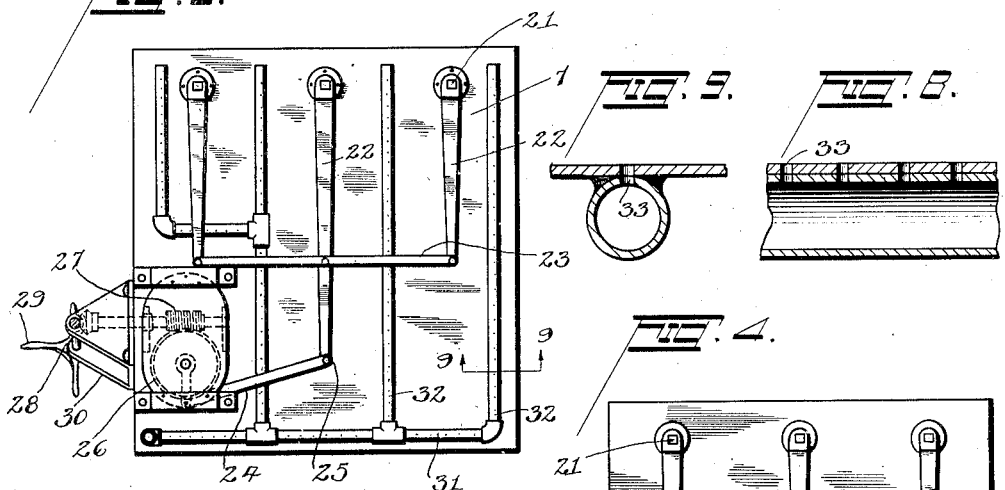
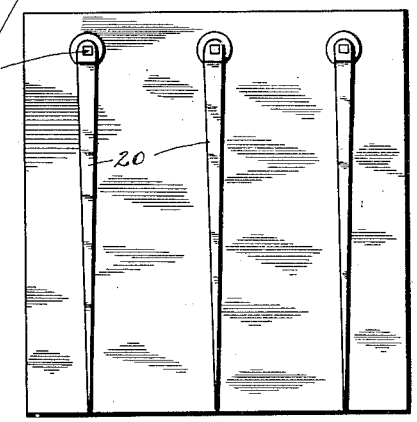
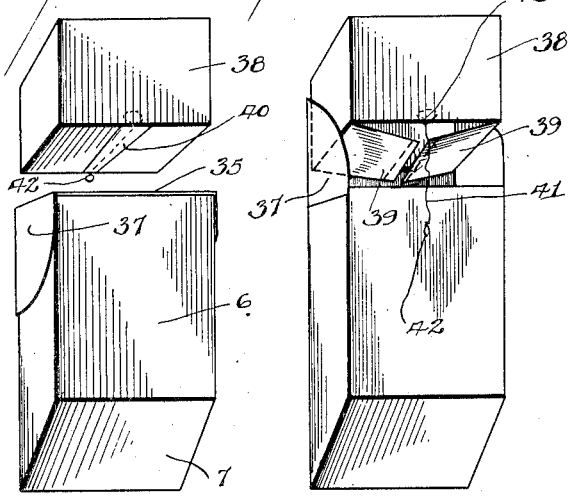
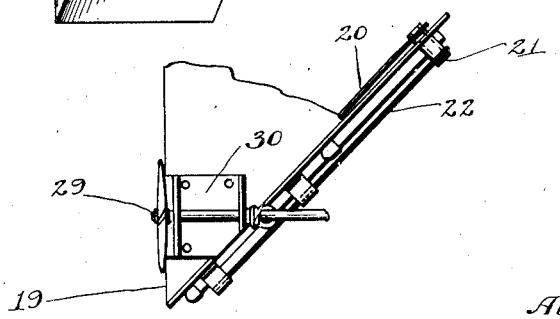
INVENTOR  
*Alan L. Morse*  
BY *Robert H. Young*  
ATTORNEY Patented Nov. 13, 1928.

1,691,205

UNITED STATES PATENT OFFICE.

ALAN L. MORSE, OF DAYTON, OHIO.

POWDER-DISTRIBUTING APPARATUS.

Application filed April 24, 1925. Serial No. 25,721.

This invention relates to powder distributors for use in aircraft, and the primary object of the invention is to provide a distributor capable of rapidly and evenly distributing powder, such as insecticide, fire extinguishers, or chemicals of various sorts, from an aircraft.

More particularly my invention concerns a hopper which is mounted on the aircraft and which is provided with a mechanical blade like agitator and with compressed air means for loosening the powder within the hopper for insuring its even distribution to a Venturi shaped distributor, which is attached below the fuselage of the aircraft so that it terminates in a flattened exit portion adjacent the rear edge of the wing and below the same. The powder is thus distributed in the down-wash of the wing and is thus more certainly directed to its objective. The hopper is further provided with a top closure which forms a windshield when opened, and in this position a closed and sealed carton of powder may be inserted so as to fit neatly within the top of the hopper and shielded by the windshield, so as to renew the quantity of powder contained by the hopper. A further additional feature of novelty of my invention is the mounting of the exhaust pipe of the aircraft engine so that the exhaust is discharged into the throat of the venturi, thus assisting in reducing the back pressure on the engine, and also increasing the flow of gas through the venturi and finally breaking up the powder or other chemical as soon as the powder or chemical is received or sucked into the throat portion of the venturi.

A further object of my invention will be more fully set forth in the attached specification, in the claims, and in the drawings in which Fig. 1 is a side elevation of an aircraft showing my novel distributor mounted thereon.

Fig. 2 is a bottom plan view of Fig. 1.

Fig. 3 is a bottom plan view of the lower angularly extending wall of the hopper.

Fig. 4 is a top plan view looking directly at the same wall of the hopper as shown in Fig. 3.

Fig. 5 is the detail of the lower portion or bottom of the hopper.

Fig. 6 is a perspective view of the hopper with the top closure closed and showing a carton of powder ready to be emptied into the hopper.

Fig. 7 is a view corresponding to Fig. 6 with the carton received and shielded by the open top closure.

Fig. 8 is a center section taken along one of the actuating pipes and

Fig. 9 is a transverse section on the line 9—9 of Fig. 3 through one of the pipes corresponding to Fig. 8.

Referring more particularly to the drawings by reference characters, 1 indivates a fuselage of an aircraft provided with the usual pilot's cockpit 2, exhaust manifold 3, and upper and lower sustaining surfaces 4 and 5. The fuselage of the aircraft is adapted to detachably receive therein a hopper 6 of substantially rectangular cross section, and provided with a forwardly and downwardly sloping bottom wall 7. This hopper is contained in front of the aviator's cockpit at a point closely adjacent to the center of gravity of the aircraft, and may be within the fuselage or strapped on the outside. The hopper is adapted to contain powder or chemicals such as fire extinguishing material, insecticide, fertilizer or smoke producing powder, which it is desired to distribute over a large portion of the ground or vegetation. The powder is received from the hopper by a generally Venturi shaped distributor, detachably secured below the aircraft fuselage and wings. This distributor has a restricted throat portion and the lower discharge opening of the hopper communicates with this throat portion. The venturi, which is designated generally 10, is flattened as shown in Figs. 1 and 2, and consists of a forward opening 11, a restricted throat portion 12, both of which are considerably flattened, and a rearward elongated discharge or exit 13, which is flattened more than the forward portions of the venturi, so that a fishtail shaped exit is provided which terminates below and at the rear portion of the lower plane, so that the powder will be received in the downwash of the air from the plane or wing. A series of vertical vanes 11' is provided within the forward opening and a second series 13' within the rear portion to provide for even distribution of the powder.

In order to intensify the flow of fluid through the venturi the exhaust manifold 3 which conducts the exhaust from the engine is connected to a pipe 14, which terminates in a flattened restricted opening 15 at or immediately in front of the restricted portion of the venturi. The flattened portion 15 of the exhaust pipe extends practically the full lateral extent of the restricted portion of the venturi, so that a large contact surface is provided to permit the intimate mixture and atomization of the powder when it is received from the hopper.

A handle 16 pivoted at 17 is located adjacent the pilot and permits him to open and close a valve or gate 18, which slides vertically up and down to open or close the lower discharge opening from the hopper. The lower wall 7 of the hopper as previously stated, extends angularly forward and downward so as to guide the powder to the discharge opening which is located at the point 19. In order to prevent the powder from packing and to insure the free passage thereof, a series of blade shaped agitators 20 are pivoted at 21 and oscillate back and forth as they are mechanically driven, so as to sweep over the upper surface of the lower wall 7. These blades are actuated by arms 22 which extend forwardly and downwardly and are interconnected by the link 23 for simultaneous actuation by means of operating arm 24, one end of which as at 25 is given a reciprocatory motion by the connection to the worm wheel 26, driven by a worm 27 actuated by the shaft 28 on the end of which is provided an air fan 29. A bracket 30 provides bearings for the shaft 28 and serves to mount the air driven fan directly on the hopper. The air driven fan, also through a rearward extension of the shaft 28, drives an air compressor 29 which is connected by a pipe 30 to a horizontally extending pipe 31 attached directly to the lower portion of the bottom wall 7 of the hopper. Branch pipes 32 extend upwardly from the main pipe 31, and these various pipes are all provided with a series of holes 33, which extend upwardly through the pipes and through the wall 7 so that the interior of the hopper is in communication with the interior of the various pipes, and so that the compressed air supplied from the air compressor 29 may be distributed at a number of points within the hopper to insure the loosening of the powder in case the latter should become packed. In such a contingency the air compressor will increase the pressure supplied to the various openings 33 until this pressure is sufficient to overcome the resistance of the packed powder, at which time the powder will be disturbed and with the assistance of the blades 20 helped into the restricted portion of the venturi. The venturi at its restricted portion may be slightly enlarged immediately to the rear of the point, and immediately to the rear of the point where the powder is received therein, so that a suction will be maintained at this point even though the powder is constantly being supplied to it from the hopper. This slight enlargement is indicated at 34 in Fig. 1.

At the upper end of the hopper is provided a closure 35 which is hinged along the forward upper edge of the carton at 36. Projecting side ears or portions 37 are provided on the closure 35 and these two parts together form a protecting windshield when the closure is opened as shown in Fig. 7 and these prevent the powder from being violently disturbed by the air turbulence. The powder is adapted to be contained and transported in sealed paper or cardboard-cartons 38 which are adapted to neatly fit within the top of the hopper and between the sides of the top closure as shown in Fig. 7. The two bottom portions 39 of the carton 38 are sealed together by a strip of material 40 inside of which a wire or cord 41 has been laid. The strip of material 40, which is permanently attached to the bottom portions 39 is attached to be easily ruptured by the cord or wire 41 when a pull is exerted on the end 42 of this wire. The other end of the cord is attached at 43 to an end of the carton. It will thus be understood that a very simple means is provided for permitting the cartons to be emptied and to permit the sealing of the hopper while in flight without permitting the high airspeed to interfere and blow the powder or dust about.

I claim:

1. A distributor for distributing substances to the atmosphere from an aircraft, comprising in combination with the aircraft a hopper mounted thereon and a Venturi shaped distributor having a flattened rear portion mounted beneath the aircraft with its restricted throat in communication with the hopper to receive the substances therefrom, the flattened rear portion of the distributor being mounted beneath and adjacent the rear edge of the wing, for the purpose described.

2. A distributor for distributing substances to the atmosphere from an aircraft, comprising in combination with the aircraft a hopper mounted thereon, a flattened Venturi shaped distributor mounted adjacent said hopper with its restricted throat portion in communication with the bottom of the hopper to receive the substances therefrom and distribute them to the atmosphere, and an engine exhaust pipe terminating at the restricted throat of the venturi for the purpose described.

3. A distributor for distributing substances to the atmosphere from an aircraft, comprising in combination with the aircraft a hopper mounted thereon, a flattened Venturi shaped distributor mounted adjacent said hopper with its restricted throat portion in communication with the bottom of the hopper to receive the substances therefrom and distribute them to the atmosphere, and an engine exhaust pipe terminating at the restricted throat of the venturi, the exit of said exhaust pipe being of considerable width and very small vertical height so that the exhaust of the engine of the aircraft will be discharged for the full lateral extent of said flattened venturi.

4. A distributor for aircraft comprising in combination an aircraft, an engine therefor, a hopper detachably mounted on said aircraft, a flattened Venturi shaped distributor mounted beneath the aircraft with its restricted throat in communication with the bottom of the hopper to receive the substances from the hopper and distribute them to the atmosphere, an engine exhaust pipe terminating in a flattened exit within the restricted throat of the venturi, said venturi having a flattened exit opening beneath and adjacent to the rear edge of the wing of said aircraft.

5. A distributor for distributing substances from an aircraft, in combination with the aircraft a hopper mounted thereon, a top closure for said hopper hinged at a forward upper portion thereof, side portions on said closure, said closure and side portions when opened upwardly providing a wind shield for the top of said hopper, a powder carton neatly fitting the top of said hopper and adapted to be shielded from the wind by said windshield, and means for readily releasing the powder from said carton to empty it into the hopper.

6. A powder distributor for use on aircraft comprising in combination a hopper carried by the aircraft and a sealed paper carton of powder adapted to fit neatly into the top of the hopper, and means for quickly releasing the powder from said carton through a lower portion thereof.

7. A distributor for powder distribution from aircraft, comprising in combination a hopper adapted to be detachably connected to an aircraft, a flattened Venturi shaped distributor adapted to be detachably connected adjacent said hopper, a wind driven fan mounted directly on said hopper and means for agitating the powder within the hopper, said means being actuated by said fan.

8. A distributor for powder distribution from aircraft, comprising in combination a hopper adapted to be detachably connected to an aircraft, a flattened Venturi shaped distributor adapted to be detachably connected adjacent said hopper, a wind driven fan mounted directly on said hopper, and means for agitating the powder within the hopper, said means being actuated by said fan, said venturi having a flattened exit portion terminating adjacent to and below the rear edge of the lower ring of the aircraft to distribute the powder in the downwash from said wing.

9. A distributor for distributing substances to the atmosphere from an aircraft, comprising in combination with the aircraft a hopper mounted thereon, and a Venturi shaped distributor having a flattened rear portion mounted beneath the aircraft with its restricted throat in communication with the bottom of the hopper to receive the substances from the hopper and distribute them to the atmosphere, and a series of vertical vanes within said distributor to provide an even flow of substance through the same.

In testimony whereof I affix my signature.

ALAN L. MORSE.